United States Patent Office 2,844,624
Patented July 22, 1958

2,844,624

SULFONATION PROCESS WITH EMPHASIS ON ECONOMY OF SULFONATING AGENT

Herman S. Bloch, Skokie, Ill., assignor to Universal Oil Products Company, Des Plaines, Ill., a corporation of Delaware No Drawing. Application May 21, 1956
Serial No. 585,959

9 Claims. (Cl. 260—505)

This invention relates to a process for effecting the sulfonation of organic compounds, particularly alkyl aromatic hydrocarbons, in the production of surface active agents, by means of a process utilizing an oleum as the sulfonating agent and in which process the excess sulfonating agent is separated from the resulting sulfonic acids and the recovered sulfonating agent fortified with additional sulfur trioxide to form a sulfonating agent which can be recycled to the sulfonation step. More specifically, this invention relates to certain improvements in the sulfonation of alkyl aromatic hydrocarbons whereby the sulfonic acid product is recovered from the reaction mixture in a form containing substantially none of the sulfuric acid phase separated from the sulfonic acid as the mono-hydrate, the recovered sulfuric acid mono-hydrate being separately refortified with sulfur trioxide to form an oleum capable of being recycled to the sulfonation process and utilized therein as the sulfonating agent.

It is an object of this invention to effect sulfonation reactions with particular economy of the sulfonating agent and without concomitant production of spent sulfuric acid as a net product of the process. Another object of the invention is to produce sulfonated organic compounds of light color, containing negligible quantities of oxidized and/or other degradation by-products. Still another object of the invention is to produce sulfonic acids substantially free of sulfuric acid, or sulfonates uncontaminated by large quantities of sulfates.

In one of its embodiments this invention concerns a sulfonation process wherein a sulfonatable organic compound is contacted with an oleum containing from about 5 to about 65% sulfur trioxide at sulfonating conditions to thereby form a mixture containing sulfonic acids and an excess of sulfonating agent, adding sufficient water to the reaction mixture to form an upper layer comprising a mono-hydrate of the sulfonic acid product and a lower layer comprising sulfuric acid mono-hydrate, separating the resulting layers, adding sulfur trioxide to the thus-separated sulfuric acid mono-hydrate lower layer to form said oleum and thereafter recycling the resulting oleum to the sulfonation reaction.

Other embodiments of the above invention relate to the sulfonation of particular organic charging stocks, further particularization of the reaction conditions and the feature of withdrawing a sulfuric acid mono-hydrate slip-stream from the process flow to thereby remove impurities in the sulfuric acid which would normally tend to accumulate in the recycled acid stream, as well as other embodiments hereinafter more specifically referred to.

This invention is primarily directed to a process for sulfonating organic compounds with particular emphasis on the production of mono-sulfonic acid derivatives, useful as surface active agents, and particularly the production of detergents, although the method may also be readily adapted to a method of producing poly-sulfonic acid derivatives as well as sulfonic acids for uses other than surface active agents. A particularly useful adaptation of the method is for the production of the sulfonic acid or sulfonate derivatives of certain sulfonatable hydrocarbons of either aliphatic or cyclic structure, particularly the aromatic hydrocarbons and especially the long chain alkyl-substituted mono- or bicyclic aromatic species for detergent manufacture, including, for example the non-alkylated or alkylated derivatives of benzene, toluene, xylene, cumene, cymene, and other short chain alkyl-substituted benzenes. The long chain alkyl derivatives of the above are particularly suitable charging stocks herein, the sulfonated derivatives of which are utilizable as intermediates in the preparation of surface active products, including such compounds as octylbenzene, nonylbenzene, nonyltoluene, decylbenzene, decylxylene, dodecylbenzene, dodecyltoluene, pentadecylxylene, octadecylbenzene, and higher alkyl homologs containing up to about 22 carbon atoms per alkyl group; amylnaphthalene, diamylnaphthalene, octylnaphthalene, methyl-octylnaphthalene, dimethyl-amylnaphthalene, decylnaphthalene, and other alkylated benzene and naphthalene derivatives. Another class of compounds which may be sulfonated in accordance with the present process with the present oleum sulfonating agents are the olefinic hydrocarbons containing from about 5 to about 25 carbon atoms per molecule, particularly the intermediate compounds within this range which are useful as charging stocks for preparing surface active materials, such as dodecylene, pentadecylene, octadecylene, nonyldecylene, etc. Paraffinic and cyclo-paraffinic hydrocarbons may also be sulfonated, generally under more severe reaction conditions such as higher temperatures, greater reagent to feed stock ratios, etc. to form the corresponding sulfonic acids and for this purpose saturated hydrocarbons within the range of from about $C_4$ to about $C_{25}$ may be utilized as feed stock. The fatty acids, as another class of sulfonatable organic compounds, may also be employed in the present process as the charging stock, including the saturated and unsaturated fatty acids containing from 5 to about 20 carbon atoms per molecule, to form the corresponding sulfo-carboxylic acids which are also generally useful in the formation of surface active agents of the type characterized as wetting agents, particularly when an aliphatic acid containing from 10 to about 20 carbon atoms is employed in the reaction. Thus, typical representative members of the aliphatic series are such compounds as oleic acid, linoleic acid, palmitic acid, margaric acid, undecylenic acid, or the esters of such acids represented, for example, by the triglycerides which occur naturally in the form of fats and waxes of animal or vegetable origin.

The initial sulfonating agent utilized in the present process is an oleum containing from about 5 to about 65% by weight of free sulfur trioxide (that is, sulfur trioxide dissolved in 100% sulfuric acid, not combined with water) which is charged to the sulfonation reaction in an amount sufficient to supply an oleum to feed stock ratio of from about 0.9 to 1 to about 4 to 1 moles of free sulfur trioxide per mole of organic compound to be sulfonated, the particular ratio utilized in any specific reaction depending upon the concentration of the sulfur trioxide in the oleum, the charging stock to be sulfonated and the reaction conditions to be employed in the process. In general, however, the more highly concentrated the oleum (that is, the greater the quantity of free sulfur trioxide dissolved in the oleum), the lower the oleum to feed stock ratio required to effect substantially complete mono-sulfonation. In general, too, lower oleum to feed stock ratios may be employed as the temperature of the sulfonation reaction is increased. However, when it is desired to effect poly-sulfonation of the charging stock, the oleum concentration may be increased to values sufficient to supply more free sulfur trioxide than would be theoretically required on a molar basis in order to introduce more than one sulfo radical per molecule into the organic charging stock. The selection of the most suitable oleum for the process, within the range prescribed by the considerations hereinafter indicated, will depend upon the general stability of the charging stock to the oleum at the reaction conditions and may best be determined by trial and error methods for the particular feed stock.

The sulfonation reaction of this invention is carried out at temperatures of from about −10° to about 50° C., or higher, particularly when oleums of low sulfur trioxide content are utilized in the process, the viscosity of the reaction mixture increasing as the temperature is reduced and as the sulfur trioxide content of the oleum increases. Thus, in order to adequately dissipate the exothermic heat of the sulfonation reaction, the viscosity must be controlled within a range which will permit rapid and vigorous stirring of the reaction mixture to thereby distribute the latter in the reaction vessel over the inside cooling surfaces and thereby eliminate local high temperature zones and the deterioration of the charge stock which accompanies overheating of these hydrocarbons in the presence of the oleum. In general, the viscosity of the reaction mixture increases as the sulfonation proceeds because as the proportion of sulfonic acids in the reaction mixture increases the highly viscous character of the sulfonic acids adds to the viscosity of the reaction mixture. In most instances, it will be found expedient to introduce into the sulfonation reaction mixture a liquid diluent of low viscosity and substantial inertness, such as a liquefied low molecular weight paraffin, sulfur dioxide etc., in order to reduce the viscosity of the mixture as a whole as the sulfonation proceeds. Particularly useful for this purpose are the inert paraffinic hydrocarbons and their halogenated analogs which are liquid at the temperature of the sulfonation reaction or which may be liquefied by suitable pressure regulation, including such hydrocarbons as n-butane, n-pentane, n-hexane, cyclohexane, carbon tetrachloride, chloroform, dichlorodifluoromethane, trichloroethane, etc. Suitable diluent ratios in the reaction mixture may be, for example, from about 0.5 to about 10 volumes of liquid diluent per volume of charging stock and they may each be initially introduced into the reactor as a solution of one in the other.

Following completion of the sulfonation reaction in which the oleum is contacted with the organic feed stock and the mixture allowed to react at sulfonating reaction conditions to form the mixture of sulfonic acids and excess oleum, the reaction mixture is diluted with a sufficient quantity of water to form the mono-hydrates of the sulfonic acid product and the excess sulfuric acid present in the reaction mixture. It has been found that when sufficient water has been added to the sulfonation reaction mixture to form a mono-hydrate of the sulfuric acid present in the reaction mixture, as well as the sulfonic acid therein, phase separation takes place, the resulting lower liquid phase consisting almost exclusively of sulfuric acid mono-hydrate and the upper phase (marked by a distinct phase boundary) consisting of an equimolar adduct of the mono-hydrates of the sulfonic acid product and sulfuric acid. Furthermore, the lower sulfuric acid phase contains substantially none of the sulfonic acid product present in the upper phase, such that upon decantation of the upper phase from the lower sulfuric acid phase, the upper phase takes not more than an equimolar proportion of the sulfuric with it as an adduct therebetween and the lower sulfuric acid phase takes substantially none of the sulfonic acid product with it. Each of the phases thus separated is reserved for further utilization in the process, the upper sulfonic acid phase, comprising the desired product of the process, being utilized as such, or neutralized with a suitable base when the sulfonate salt derivative is the desired end product.

In accordance with the present process, the lower, predominantly sulfuric acid phase in the form of its monohydrate is reserved for subsequent recycle in the process after replacing the sulfur trioxide present in the starting oleum to the concentration of free sulfur trioxide desired for effecting the present sulfonation process.

The critical factor which determines the operability of the present method and the advantages inherent therein is the regeneration of the oleum by fortifying the spent sulfuric acid mono-hydrate phase separating from the prior sulfonation cycle with sufficient sulfur trioxide to regenerate the quantity and acid strength of the initial starting oleum. The regeneration stage of the process is therefore dependent upon an exact balance between the amount of acid charged to the sulfonation step with the amount of sulfur trioxide utilized in the regeneration step so that the ultimate quantity and concentration of regenerated oleum is precisely suitable for the particular sulfonation process, neither an excess nor an insufficiency being permissible to obtain the desired quantitative or substantially quantitative conversion of the charge stock to its mono-sulfonated derivative and without undue production of side reaction products and of net spent sulfuric acid. On the basis of experimental results and calculations the amount of acid required to effect such conversion has been determined to be a function of its concentration, the relationship being expressed by the equation:

(1) $$W = 1.49 - 0.01267P$$

where W is equal to the weight proportion of sulfonation acid used per weight of organic charging stock (for this equation, dodecylbenzene hydrocarbon), and P is the percent sulfur trioxide in the oleum. For monosulfonation of other alkyl benzene hydrocarbons, molar equivalent amounts of oleum are used. The actual values of P and W, calculated for 4 oleum concentrations for the sulfonation of dodecylbenzene are as follows:

| Oleum Concentration, P | Weights of Oleum per Wt. of Dodecylbenzene, W. |
| --- | --- |
| 15% | 1.30 |
| 20% | 1.235 |
| 25% | 1.17 |
| 30% | 1.11 |

The empirical values expressed in Equation 1, above, are mathematically derived, with the aid of experimental results, in accordance with the following sequence of steps: The composition of the starting oleum is known and can be designated on the basis of moles of acid per mole of alkyl benzene as $2N+N'$, where $2N$ is a number of moles of sulfuric acid ($H_2SO_4$) per mole of alkyl benzene present, and $N'$ is the number of moles of sulfur trioxide per mole of alkyl benzene charged into the reaction. The value of P may then be determined on the basis of the following relationship:

(2) $$\frac{(80 N')(100)}{196 N + 80 N'} = P$$

During the sulfonation of one mole of alkyl benzene charging stock, $N'$ moles of sulfur trioxide and $(1-N')$ moles of sulfuric acid are consumed, the reaction being accompanied by the generation of $(1-N')$ moles of water (disregarding the sulfonic acids present in the acid). In order to "spring" the sulfonation reaction mixture and thereby cause phase separation between the mono-hydrate of the sulfonic acid product and the mono-hydrate of the spent sulfonation acid by the addition of sufficient water to the reaction mixture to form said mono-hydrates, the amount of water required is equal to:

$$1 + 2N - 2(1 - N')$$

The upper layer which separates from the sulfonation mixture is a molecular complex of the sulfonic acid monohydrate and sulfuric acid mono-hydrate, the complex having the composition corresponding to:

$$1RSO_3H \cdot H_2O + 1H_2SO_4 \cdot H_2O$$

where $RSO_3H$ represents the empirical formula of the sulfonic acid. The lower layer contains $N'+2N-2$ moles of $H_2SO_4 \cdot H_2O$, and to raise the concentration of sulfur trioxide in the lower aqueous phase to the oleum concentration initially employed in the sulfonation process, there must be added $2N'+2N-2$ moles of sulfur trioxide. This method of reconstituting the sulfuric acid phase with sulfur trioxide to regenerate the initial oleum has the advantage that the heat evolved in the resulting exothermic reaction is released in the absence of the organic charging stock, such that the latter is not subjected to the oxidation and charring reactions that ordinarily result upon contact of the charging stock with a sulfonating agent at high temperatures. The oxidation and charring reactions are believed to be the result of the highly active character of oleum at temperatures generally above about 30° C., reactions which generally do not occur to the extent of forming highly colored by-product materials at temperatures below about 30° C.

Following the addition of $2N'+2N-2$ moles of sulfur trioxide to the sulfuric acid mono-hydrate separated from the dilution step, the acid layer contains $$N'SO_3 + (2N'+4N-4)$$

moles of $H_2SO_4$. If this acid is to be the same composition as the initial oleum utilized in starting the sulfonation process, then (3) $\qquad 2N'+4N-4=2N$ or (4) $\qquad N'=2-N$ and the lower layer formed during the "springing" stage contains N moles of $H_2SO_4 \cdot H_2O$ which provides the sulfuric acid mono-hydrate utilized as the source of recycle acid in the oleum-regeneration step involved in the present invention.

The simultaneous solution of Equations 4 and 2 for representative values of P provides the following values of N and N', indicated in the table:

| Oleum Concentration, P | N | N' | Total Moles Acid/Moles Alkyl Benzene 2N+N' |
|---|---|---|---|
| 15 | 1.396 | 0.604 | 3.396 |
| 20 | 1.24 | 0.76 | 3.24 |
| 25 | 1.10 | 0.90 | 3.10 |
| 30 | 0.976 | 1.024 | 2.976 |

When a 30% oleum or stronger acid is initially charged (and N' is greater than 1) only a single mole of sulfur trioxide is consumed to effect the sulfonation reaction and the quantity of water evolved (1−N') becomes negative, indicating an excess of sulfur trioxide.

Referring again to Equation 1, above, the values of the empirical constants in the equation are determined by plotting the values of W, calculated from the values of N and N', against the oleum strength. A linear relationship results and the above constants are determined by reading the same from the graph of the resulting plotted values.

The sulfur trioxide utilized to regenerate the oleum from the sulfuric acid mono-hydrate phase separating upon the addition of the required quantity of water to the sulfonation reaction mixture to effect phase separation may be supplied in any of the several forms of sulfur trioxide available in various physical states. Thus, sulfur trioxide exists in several modifications, including the so-called alpha-form which is a solid, asbestos-like material melting at about 62° C. and generally considered to be a sulfur trioxide polymer, the beta-form, also a polymeric solid at atmospheric temperatures, melting at about 33° C. and the preferred gamma-form which is normally liquid sulfur trioxide at room temperatures containing a large proportion of monomeric sulfur trioxide and melting at about 17° C. The sulfur trioxide, in any of its physical modifications indicated above, when added to the sulfuric acid mono-hydrate phase separating from the sulfonation reaction mixture after the addition of water thereto and the formation of the sulfuric acid monohydrate layer undergoes a highly exothermic reaction, and the mixture is preferably cooled during the addition of sulfur trioxide. Because of the difficulty of dissipating the large quantities of heat evolved, the addition of the sulfur trioxide is preferably effected on a continuous basis in order to provide the time necessary for removing the exothermic heat liberated as the result of the hydration of sulfur trioxide.

The process and the several steps involved in the process herein provided may be effected on either a batch or continuous basis, the various reactant streams being combined at the appropriate time during the course of the process to effect the maximum degree of sulfonation with the development of a minimum of by-products, such as poly-sulfonated materials, resinous and tarry substances which impart a color to the final product and cracked side chains of the initial starting material, generally formed as a result of cracking reactions which may take place when the temperature of the reaction exceeds a desirable maximum. One of the preferred methods of effecting the process comprises continuously mixing the organic compound to be sulfonated with a stream of the regenerated oleum in a reactor in which a high state of turbulence exists, for example, turbulence produced by a rapidly rotated stirring paddle or other well-known mixing device, introducing the oleum at a rate sufficient to provide the desired proportion of sulfur trioxide per part of organic charging stock, the exact ratio being dependent upon the concentration of sulfur trioxide in the oleum, allowing the resulting thoroughly dispersed reaction mixture to flow into a time tank where the reactants are allowed to remain in contact with each other for a predetermined period of time, sufficient to effect substantially complete mono-sulfonation of the charging stock, or allowing the mixture to flow through a cooled, elongated reactor which maintains the reaction mixture in contact for a time sufficient to effect the desired mono-sulfonation and thereafter withdrawing the reaction mixture from the effluent end of the reaction vessel into the subsequent stages of the process. In a typical batch-type operation, the reaction mixture which contains the excess sulfonating agent and the sulfonic acids formed by virtue of the reaction may be accumulated within a reservoir from a batch-type process and thereafter mixed with a quantity of water sufficient to form the monohydrates of both the sulfonic and sulfuric acids present in the reaction mixture. In a continuous type of operation the continuously flowing stream of reaction products may be continuously mixed with a stream of water added in sufficient quantity to form the aforementioned mono-hydrates and thereafter allowed to flow into a settling chamber where the desired phase separation is allowed to take place between the sulfuric acid mono-hydrate layer and the sulfonic acid mono-hydrate layer, both the upper phase and lower phase being continuously and separately withdrawn at a rate sufficient to balance the rate of incoming reactants. The sulfonic acid phase is thereafter transferred to a product recovery stage of the process and the sulfuric acid monohydrate phase is transferred to an oleum regeneration zone for the addition of sulfur trioxide thereto and the oleum is reconstituted to its initial starting strength and quantity. The sulfur trioxide may be added to the sulfuric acid mono-hydrate as a solid or in the form of a gas, preferably diluted with an inert carrying agent which provides a convenient means for transferring the sulfur trioxide from a bulk supply of the reagent into the oleum regenerating vessel. As previously indicated, the preferred oleum concentration is one which contains from about 15 to about 30% by weight of free sulfur trioxide.

Because of the inherent tendency of sulfonation reactions to form at least a small quantity of undesirably colored by-products as a result of the oxidizing and polymerizing capacity of the oleum which inherently takes place at least to a small extent under all reaction conditions, the recycle oleum gradually accumulates an undesirably high proportion of colored by-product materials therein which are capable of being transferred to the final product when the concentration of colored impurities in the sulfuric acid phase becomes too large. One method of purifying the oleum to prevent the accumulation of colored impurities in the recycle oleum stream and thereby maintain the concentration of colored impurities in the product at a low level comprises withdrawing a small slip-stream, for example, from about 0.5 to about 15% by volume of the recycle acid stream for discard from the process flow or for recovery of the sulfuric acid therefrom in a purified form. The slip-stream is conveniently withdrawn from the recycle acid stream prior to the addition of sulfur trioxide to the sulfuric acid monohydrate phase separated in the phase decantation step.

One of the preferred modifications of the basic process flow hereinabove described is the method of effecting the sulfonation, dilution and fortifying steps in the presence of an inert diluent having a boiling point at or below the temperature found to be especially suitable for the particular operation. Thus, the sulfonation stage of the process is desirably effected at a temperature of from about −10° to about 40° C. and in order to conveniently maintain this temperature level constant during the entire sulfonation reaction, a diluent which boils at the particular, desired temperature may be added to the reaction mixture and allowed to evaporate as the oleum is mixed with the charging stock, and the exothermic heat of the sulfonation reaction is liberated, the evaporation of the diluent effecting temperature control by virtue of the self-refrigeration or evaporative cooling of the diluent. Similarly, during the dilution of the sulfonation reaction mixture with water to effect phase separtaion between the mono-hydrates of the sulfonic acid product and the lower sulfuric acid phase, the exothermic heat of reaction is dissipated by the evaporative cooling effect of the diluent. The vapors may be conveniently allowed to distill into a reflux condenser which returns the diluent in liquid form to the reactor. In a similar manner, the addition of sulfur trioxide to the sulfonic acid monohydrate layer may be effected in the presence of a diluent which carries away the exothermic heat of the reaction by evaporative cooling. Suitable diluents for this purpose are the essentially inert compounds selected generally from the group consisting of the paraffinic hydrocarbons, such as propane, butane, pentane, hexane, cyclohexane, cyclopentane etc., the chlorinated paraffin hydrocarbon analogs, such as 1,2-dichloropropane, 1,1,2,2-tetrachloroethane, dichloro-difluoromethane, carbon tetrachloride, chloroform, etc., liquefied sulfur dioxide (although less preferred, because of the difficulty of removing the last traces of sulfur dioxide from the product) and other inert materials boiling at or near the desired process temperature.

The present invention is further illustrated with respect to its several embodiments in the following examples which, however, are not intended to limit the scope of the invention necessarily in accordance therewith.

*Example I*

The present method of sulfonation is particularly applicable to the preparation of detersive and surface active products wherein the presence of colored impurities is particularly undesirable because of the adverse effect of the presence of the dark colored impurities in laundering and other washing solutions. Furthermore, the method is particularly advantageous for the sulfonation of alkyl benzene type hydrocarbons wherein the susceptibility of side-chain-cracking and the requirement of severe reaction conditions to effect substantially complete mono-sulfonation of the alkyl benzene nucleus makes the process one of peculiar difficulty, but yet one of peculiar sensitivity. It is also a particular requirement of the process to obtain substantially complete mono-sulfonation in order to limit the number of hydrophilic groups in the ultimate product and thereby to provide a detergent of maximum cleansing power. As indicated, the introduction of a single sulfonic acid radical on the aryl nucleus is substantially more difficult for the long chain alkyl-substituted benzenes than for the corresponding shorter-chain derivatives, for example. For this reason, more highly concentrated oleums and more severe reaction temperatures are generally required for the mono-sulfonation of long-chain alkyl benzenes than for shorter-chain alkyl benzenes. In the following example, dodecylbenzene is utilized as the charging stock to be mono-sulfonated to produce a yield representing at least 96% of the theoretical yield obtainable. Based on predetermined results from a series of experiments utilizing various oleum concentrations and various oleum to hydrocarbon molar ratios, it has been determined that an oleum containing from 24 to about 30% free sulfur trioxide, utilizing a ratio of free sulfur trioxide in the oleum to hydrocarbon of from about 0.9 to about 1.25 moles per mole of benzene alkylate results in particularly desirable products and these conditions are therefore utilized in the following run.

10 moles of dodecylbenzene (2.46 kg.), formed by the sulfuric acid catalyzed alkylation of benzene with propylene tetramer was charged into a stirred sulfonation flask and the temperature lowered to 10° C. by means of an ice bath surrounding the flask. As the hydrocarbon is rapidly stirred, 2.73 kg. of 30% oleum is slowly added over a period of 6 hours to the dodecylbenzene contained within the cooled flask, the quantity of oleum corresponding to 1.110 weight proportions of oleum per weight of dodecylbenzene charged into the sulfonation reactor. The above quantity of oleum contains 819 grams of sulfur trioxide or 10.24 moles, 10.0 moles of which are consumed in the formation of dodecylbenzene sulfonic acid in substantially 100% yield. Approximately 0.25 mole of sulfur trioxide therefore remains in the reaction mixture unreacted with the alkylate charged thereto. In addition, 1.91 kilograms of sulfuric acid remains in the reaction mixture, the acid being of 100% concentration, since the sulfonation with sulfur trioxide contained in the oleum forms no water by virtue of the sulfonation reaction. 30 moles or 540 grams of water are thereafter added to the sulfonation mixture over a period of 2 hours accompanied with cooling the reaction flask to remove the exothermic heat of hydration. Upon completion of the water addition and cooling the contents of the reactor to 0° C., a two-phase system is formed, an upper layer consisting essentially of 10 moles of dodecylbenzene sulfonic acid mono-hydrate combined with 10 moles of sulfuric acid mono-hydrate and a lower layer consisting of 9.8 moles of sulfuric acid mono-hydrate. The two phases were separated by decantation, the upper layer neutralized directly with sodium hydroxide to form an aqueous slurry of sodium sulfate and sodium dodecylbenzene sulfonate, reserved for subsequent recovery of a dried detergent composition therefrom containing 71% dodecylbenzene sodium sulfonate.

The lower layer consisting of sulfuric acid mono-hydrate is thereafter cooled, surrounded with ice and 1598 grams of liquid Sulfan (stabilized alpha-form of liquid sulfur trioxide) were added thereto to regenerate 2.73 kg. of 30% oleum which may be directly transferred to a succeeding sulfonation process for conversion of an additional charge of 10 moles of dodecylbenzene alkylate.

The aqueous slurry formed on neutralization of the dodecylbenzene sulfonic acid mono-hydrate sulfuric acid mono-hydrate layer separating as the upper phase in the phase decantation step is evaporated to dryness on a steam bath, yielding a light, cream-colored detergent composition containing approximately 29% by weight of sodium sulfate, the remainder being sodium dodecylbenzene sulfonate. The product has excellent detersive properties.

*Example II*

In a sulfonation reaction to form sodium dodecylbenzene sulfonate by the sulfonation of dodecylbenzene with 15% oleum, the required amount of oleum, determined on the basis of the formula $W = 1.49 - 0.01267P$, as provided in the present invention, is calculated as 1.30 weight proportions of 15% oleum per weight of dodecylbenzene to effect substantially complete mono-sulfonation of the dodecylbenzene charged and to produce a sulfuric acid mono-hydrate phase in the dilution step of the process, which when combined with the quantity of sulfur trioxide calculated by the above formula to convert the sulfuric acid mono-hydrate layer to 15% oleum will equal the total amount of oleum required to convert a similar charge of dodecylbenzene to the mono-sulfonic acid derivative. In the following run one mole of dodecylbenzene (246 grams) is charged into a sulfonation flask containing a stirring paddle for agitating the dodecylbenzene during the addition of oleum thereto, in accordance with the procedure described in Example I, above. The sulfonation was again effected at substantially 10° C., approximately 320 grams of 15% oleum being charged into the sulfonation flask during the conversion of the dodecylbenzene to its sulfonic acid derivative. The sulfonation reaction consumes the 47.95 grams of free sulfur trioxide present in the 320 grams of 15% oleum charged in addition to 0.4 mole or 39.5 grams of 100% sulfuric acid present in the oleum. The 0.4 mole of 100% sulfuric acid consumed to complete the sulfonation produces a corresponding amount, or 0.4 mole, of water, leaving 2.37 moles of sulfuric acid unconsumed.

Following completion of the mono-sulfonation reaction which took place over a period of 3½ hours, 2.97 moles or 53.5 grams of water was added to the sulfonation reaction mixture while the latter was cooled to about 0° C. to cause phase separation to take place. One mole of water combines with the dodecylbenzene sulfonic acid to form the mono-hydrate thereof; one mole of water combines with sulfuric acid to form a mono-hydrate of sulfuric acid which accompanies the sulfonic acid in the upper layer and 1.37 moles of water combines with the remaining sulfuric acid to form the sulfuric acid mono-hydrate lower layer which separates upon standing from the upper phase, sulfonic acid-containing layer.

The lower phase comprising sulfuric acid mono-hydrate (1.37 moles) is cooled to 0° C. and combined with 160 grams of liquid Sulfan to form 319 grams of 15% oleum which is utilized as the sulfonating agent in the next succeeding sulfonation reaction.

Recovery of the sodium dodecylbenzene sulfonate formed by neutralization of the upper layer of the sulfonic acid produces a cream-colored product which is a highly effective detergent in aqueous solution.

It has been found that by removing approximately 5% of the lower sulfonic acid mono-hydrate layer formed during each phase separation step of the process, prior to the addition of sulfur trioxide thereto in the regeneration step, a lighter-colored final product is formed, because of the withdrawal of at least a portion of the dark-colored materials tending to accumulate in the sulfuric acid layer during the phase-separation step. An equivalent amount of fresh make-up 15% oleum is added each cycle to preserve the oleum balance.

Substantially similar results may be obtained for the sulfonation of other sulfonatable organic compounds, utilizing oleum to charging stock ratios, derived as indicated above. The relationship of oleum concentration to the quantity of oleum charged per weight of charging stock may likewise be determined in a manner similar to that specified above for dodecylbenzene, in a process in which the regenerated oleum is recycled to the sulfonation stage, the mono-hydrate of the sulfonic acid and excess sulfuric acid is formed by dilution of the reaction mixture with water, followed by phase separation, and the regeneration of the initial oleum is effected by adding sulfur trioxide to the lower sulfuric acid monohydrate layer. In each instance the same relative advantages as hereinabove noted for dodecylbenzene sulfonation are noted.

I claim as my invention:

1. A process for effecting mono-sulfonation of a sulfonatable hydrocarbon which comprises mixing said hydrocarbon with an oleum containing from 5 to about 65% by weight of free sulfur trioxide derived as hereinafter indicated, the amount of said oleum corresponding to a molar ratio of free sulfur trioxide in said oleum to said hydrocarbon of from about 0.9 to 1 to about 4 to 1, while maintaining the resulting mixture of oleum and hydrocarbon at a sulfonation temperature, thereafter adding water in an amount corresponding to the formula: $X = 1 + 2N - 2(1-N')$, wherein X is equal to the amount of water added, 2N is equal to the number of moles of sulfuric acid in said oleum, and N' is equal to the number of moles of free sulfur trioxide in said oleum, separating a resulting sulfuric acid monohydrate phase from an upper layer comprising predominately the monohydrate of the resultant hydrocarbon sulfonic acid and adding sufficient sulfur trioxide to said sulfuric acid monohydrate phase to form said oleum in the amount and at the sulfur trioxide concentration utilized in said sulfonation reaction, as aforesaid, and supplying the oleum thus formed from the sulfuric acid monohydrate phase to the sulfonation reaction as said sulfonating agent.

2. The process of claim 1 further characterized in that said hydrocarbon is an alkyl benzene hydrocarbon.

3. The process of claim 2 further characterized in that said alkyl benzene hydrocarbon contains a single nuclear alkyl substituent having from 8 to about 20 carbon atoms.

4. The process of claim 3 further characterized in that said alkyl benzene hydrocarbon is dodecylbenzene.

5. The process of claim 4 further characterized in that the weight of said oleum, per weight of dodecylbenzene, designated as W, to be added, is determined by means of the following formula, where P is the weight percentage of sulfur trioxide in the oleum: $W = 1.49 - 0.01267P$.

6. The process of claim 1 further characterized in that a small bleed stream in an amount of from about 0.5 to about 20% by weight of the sulfuric acid monohydrate lower phase is withdrawn from the system prior to the addition of sulfur trioxide thereto, and an equivalent amount of fresh oleum added to the sulfonation mixture.

7. The process of claim 1 further characterized in that said sulfonation is effected in the presence of a liquid diluent, substantially inert to the sulfonating agent, and selected from the saturated hydrocarbons containing up to about 6 carbon atoms per molecule and the saturated, halogen-substituted analogs of said saturated hydrocarbons.

8. The process of claim 7 further characterized in that said diluent is a normal paraffin.

9. The process of claim 8 further characterized in that said normal paraffin is normal butane.

References Cited in the file of this patent

UNITED STATES PATENTS

| | | |
|---|---|---|
| 2,204,969 | Percy | June 18, 1940 |
| 2,373,793 | Susie | Apr. 17, 1945 |
| 2,573,675 | Bloch et al. | Nov. 6, 1951 |